(12) United States Patent
Taya et al.

(10) Patent No.: US 10,215,139 B2
(45) Date of Patent: Feb. 26, 2019

(54) STRADDLED VEHICLE

(71) Applicant: YAMAHA HATSUDOKI KABUSHIKI KAISHA, Iwata-shi, Shizuoka-ken (JP)

(72) Inventors: Takeshi Taya, Shizuoka (JP); Masami Shinsho, Shizuoka (JP); Toshio Iizuka, Shizuoka (JP); Masaru Okamura, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 0 days.

(21) Appl. No.: 15/835,376

(22) Filed: Dec. 7, 2017

(65) Prior Publication Data

US 2018/0347525 A1 Dec. 6, 2018

(30) Foreign Application Priority Data

Jun. 2, 2017 (JP) .................................. 2017-110485

(51) Int. Cl.

| B62K 11/00 | (2006.01) |
|---|---|
| F02M 35/16 | (2006.01) |
| F02B 75/22 | (2006.01) |
| B62J 35/00 | (2006.01) |
| B62M 7/02 | (2006.01) |
| F02M 35/024 | (2006.01) |

(52) U.S. Cl.
CPC ............ *F02M 35/162* (2013.01); *B62J 35/00* (2013.01); *B62M 7/02* (2013.01); *F02B 75/22* (2013.01); *F02M 35/024* (2013.01)

(58) Field of Classification Search
CPC ..... F02M 35/162; F02M 35/024; B62M 7/00; B62M 7/02
See application file for complete search history.

(56) References Cited

U.S. PATENT DOCUMENTS

| 2011/0073401 A1* | 3/2011 | Hanawa ................... B60K 6/40 180/220 |
|---|---|---|
| 2015/0159604 A1* | 6/2015 | Nishimura ............. B62K 11/04 123/198 E |

(Continued)

FOREIGN PATENT DOCUMENTS

| JP | 2002-364478 A | 12/2002 |
|---|---|---|
| JP | 2005-090267 A | 4/2005 |

(Continued)

*Primary Examiner* — Brian L Swenson
(74) *Attorney, Agent, or Firm* — Rabin & Berdo, P.C.

(57) ABSTRACT

A pair of middle cowls is arranged at positions rightward and leftward of a vehicle component located at a position forward of an engine. Part of the right middle cowl is arranged at a position further forward than an air cleaner case. A space in the air cleaner case is divided by a filter element into a first space positioned at a position further downstream than the filter element and a second space positioned at a position further upstream than the filter element. The second space is smaller than the first space. The second space and a third space inward of the right middle cowl communicate with each other by a communicating portion. The second space, at least part of the third space, and an internal space of the communicating portion constitute a dirty side chamber of an air cleaner.

6 Claims, 9 Drawing Sheets

(56) References Cited

U.S. PATENT DOCUMENTS

| | | | | |
|---|---|---|---|---|
| 2016/0348622 A1* | 12/2016 | Hotta | .................. | F02M 37/0017 |
| 2017/0057583 A1* | 3/2017 | Yokoyama | ............. | B62K 5/027 |
| 2017/0284346 A1* | 10/2017 | Kontani | .................. | B62J 99/00 |
| 2018/0118295 A1* | 5/2018 | Haraguchi | ............... | B62J 17/02 |

FOREIGN PATENT DOCUMENTS

| | | | |
|---|---|---|---|
| JP | 2006-264470 A | 10/2006 |
| JP | 2010-069940 A | 4/2010 |
| JP | 2010-269715 A | 12/2010 |

\* cited by examiner

STRADDLED VEHICLE

BACKGROUND OF THE INVENTION

Field of the Invention

The present invention relates to a straddled vehicle including an air cleaner.

Description of Related Art

JP 2002-364478 A describes a motorcycle including a V-type engine. In the motorcycle of JP 2002-364478 A, an air cleaner is arranged laterally to the V-type engine. A seat is arranged at a position further rearward than the air cleaner in a vehicle plan view. A footrest (footboard) is provided downward of the air cleaner.

The air cleaner used in the motorcycle described in JP 2002-364478 A includes an air cleaner box (air cleaner case) storing a filter element. In the air cleaner box, a clean side chamber and a dirty side chamber are divided at upstream and downstream of the filter element. As such, the air cleaner box is increased in size in a width direction, a top-and-bottom direction, and a front-and-rear direction in order to ensure a sufficient capacity of the clean side chamber and the dirty side chamber. Furthermore, since the air cleaner box is shared by cylinders provided at the front and the rear of the V-type engine, a capacity required for the air cleaner box is increased, and the air cleaner is thus increased in size. In a case where the large-size air cleaner box, which is arranged laterally to the V-type engine, is arranged at a position forward than the seat and upward of the footrest, when a rider sits on the seat and places his/her foot on the footrest, the rider's leg is liable to come into contact with the air cleaner.

SUMMARY

An object of the present invention is to provide a straddled vehicle in which an increase in size of an air cleaner can be reduced and a rider's leg is unlikely to come into contact with the air cleaner.

(1) A straddled vehicle according to one aspect of the present invention includes a V-type engine, a fuel tank arranged at a position upward of the V-type engine, a seat arranged at a position further rearward than the fuel tank, an air cleaner case arranged laterally to the V-type engine so as to overlap with at least part of the V-type engine in a vehicle side view, the air cleaner case storing a filter element, a pair of side cowls arranged at positions rightward and leftward of at least part of a vehicle component located at a position forward of the V-type engine, and a footboard arranged at a position further downward than the air cleaner case, wherein at least part of one side cowl of the pair of side cowls is arranged at a position further forward than the air cleaner case, the at least part of the one side cowl overlaps with the air cleaner case in a vehicle front view, at least part of the air cleaner case is located at a position further upward than a lower end of the seat in the vehicle side view, the air cleaner case is arranged at a position further forward than a front end of the seat and further downward than the fuel tank, a side end of the air cleaner case is located at a position further outward than a side end of the fuel tank in a vehicle width direction, at least part of the air cleaner case overlaps with the footboard in a vehicle plan view, the filter element divides a space in the air cleaner case into a first space positioned at a position further downstream than the filter element and a second space that is positioned at a position further upstream than the filter element and is smaller than the first space, the air cleaner case has a communicating portion that makes the second space and a third space inward of the one side cowl communicate with each other, and the second space, at least part of the third space, and an internal space of the communicating portion constitute a dirty side chamber.

In this straddled vehicle, the pair of side cowls is arranged at the positions rightward and leftward of the at least part of the vehicle component located at the position forward of the V-type engine. Thus, the vehicle component positioned between the pair of side cowls is protected. The at least part of the one side cowl is located at the position further forward than the air cleaner case. The at least part of the one side cowl overlaps with the air cleaner case in the vehicle front view. The space in the air cleaner case is divided by the filter element into the first space positioned at the position further downstream than the filter element and the second space that is positioned at the position further upstream than the filter element and is smaller than the first space. The second space and the third space inward of the one side cowl communicate with each other by the communicating portion. Thus, the second space, at least part of the third space, and the internal space of the communicating portion constitute the dirty side chamber. In this way, at least part of the space inward of the one side cowl serves as the dirty side chamber of an air cleaner. As such, it is possible to ensure the dirty side chamber having a sufficient capacity without enlarging the space at the position further upstream than the filter element in the air cleaner case while ensuring the largeness of the first space in the air cleaner case constituting a clean side chamber. It is thus possible to ensure the clean side chamber having a sufficient capacity while reducing an increase in size of the air cleaner. In this case, since part of the dirty side chamber is arranged in the space inward of the one side cowl, the air cleaner case can be arranged at a position further forward than the seat in the front-and-rear direction of the vehicle. Furthermore, since the increase in size of the air cleaner is reduced, the amount of a lateral projection of the air cleaner case from the fuel tank can be reduced in the vehicle plan view. In addition, since the at least part of the air cleaner case is located the position further upward than the lower end of the seat in the vehicle side view, the air cleaner case is arranged at a higher position upward of the footboard. Thus, when a rider sits on the seat and puts his/her foot on the footboard, his/her leg is unlikely to come into contact with the air cleaner case.

(2) The dirty side chamber may include an internal dirty side chamber constituted by the second space, and an external dirty side chamber constituted by the at least part of the third space, and the external dirty side chamber may have a communication port that connects to the communicating portion of the air cleaner case, and an open portion that is opposite to the one side cowl.

In this case, air is led into the external dirty side chamber through the open portion of the external dirty side chamber.

(3) The one side cowl may have an opening that overlaps with at least part of the open portion of the external dirty side chamber in the vehicle side view, and the straddled vehicle may further include a lid that closes the opening.

In this case, it is possible to check a state of the external dirty side chamber by opening the lid.

(4) A component may be stored in the external dirty side chamber.

In this case, since the external dirty side chamber may be effectively used as a storage space for the component, an increase in size of the straddled vehicle is reduced.

(5) The external dirty side chamber may be formed of rubber.

In this case, a vibration sound caused by air flowing into the external dirty side chamber is reduced.

(6) The straddled vehicle may further include a head pipe and a radiator that are provided at a position further forward than the V-type engine, and the vehicle component may include at least one of the head pipe and the radiator.

In this case, at least one of the head pipe and the radiator, and a peripheral member thereof are protected by the pair of side cowls.

Other features, elements, characteristics, and advantages of the present invention will become more apparent from the following description of preferred embodiments of the present invention with reference to the attached drawings.

DETAILED DESCRIPTION

Figure 1:
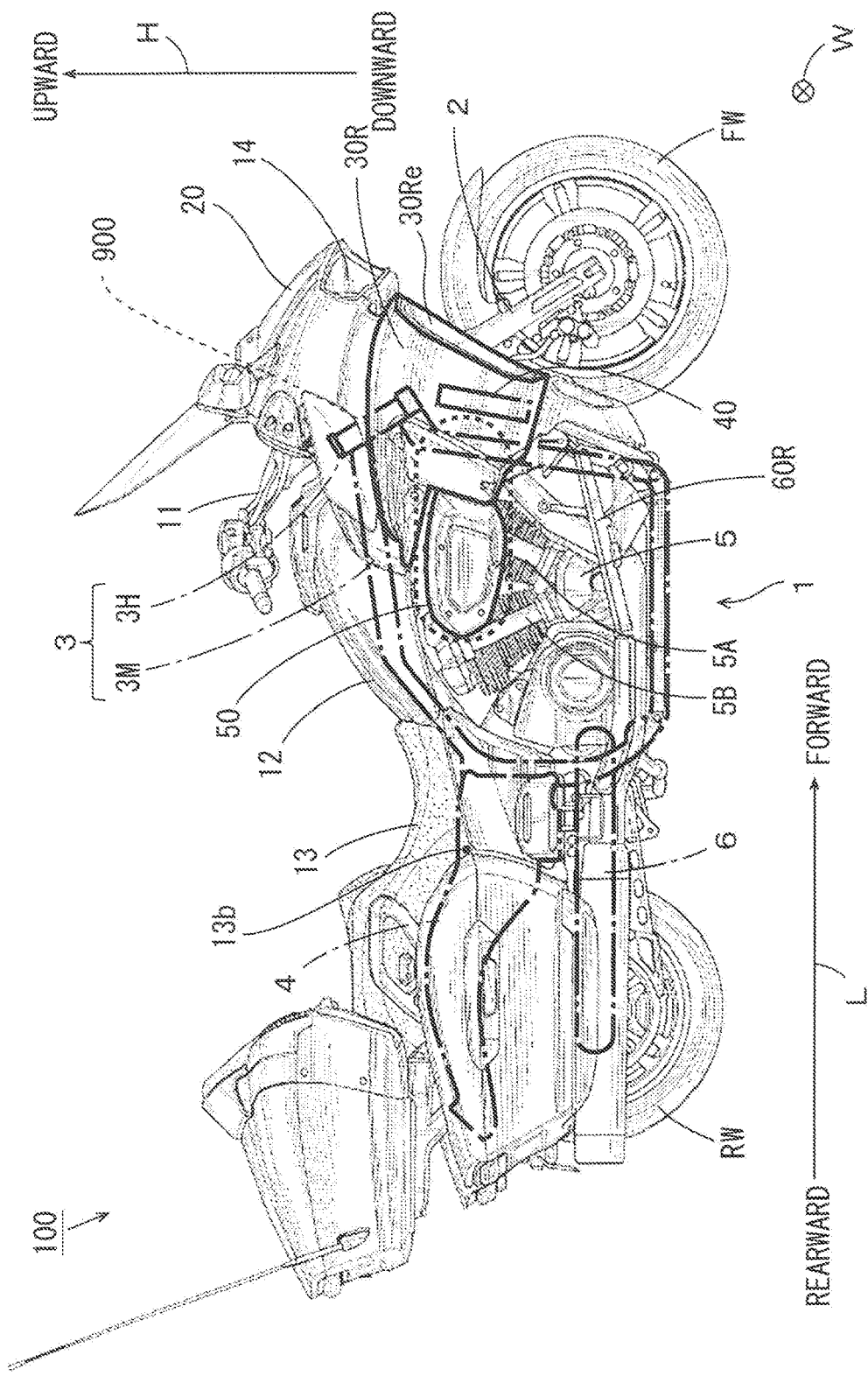
FIG. 1 is a side view of a motorcycle according to one embodiment of the present invention.

A straddled vehicle according to an embodiment of the present invention will now be described with reference to the drawing. A motorcycle will be described as an example of the straddled vehicle in the following description.

(1) Schematic Configuration of Motorcycle

Figure 2:
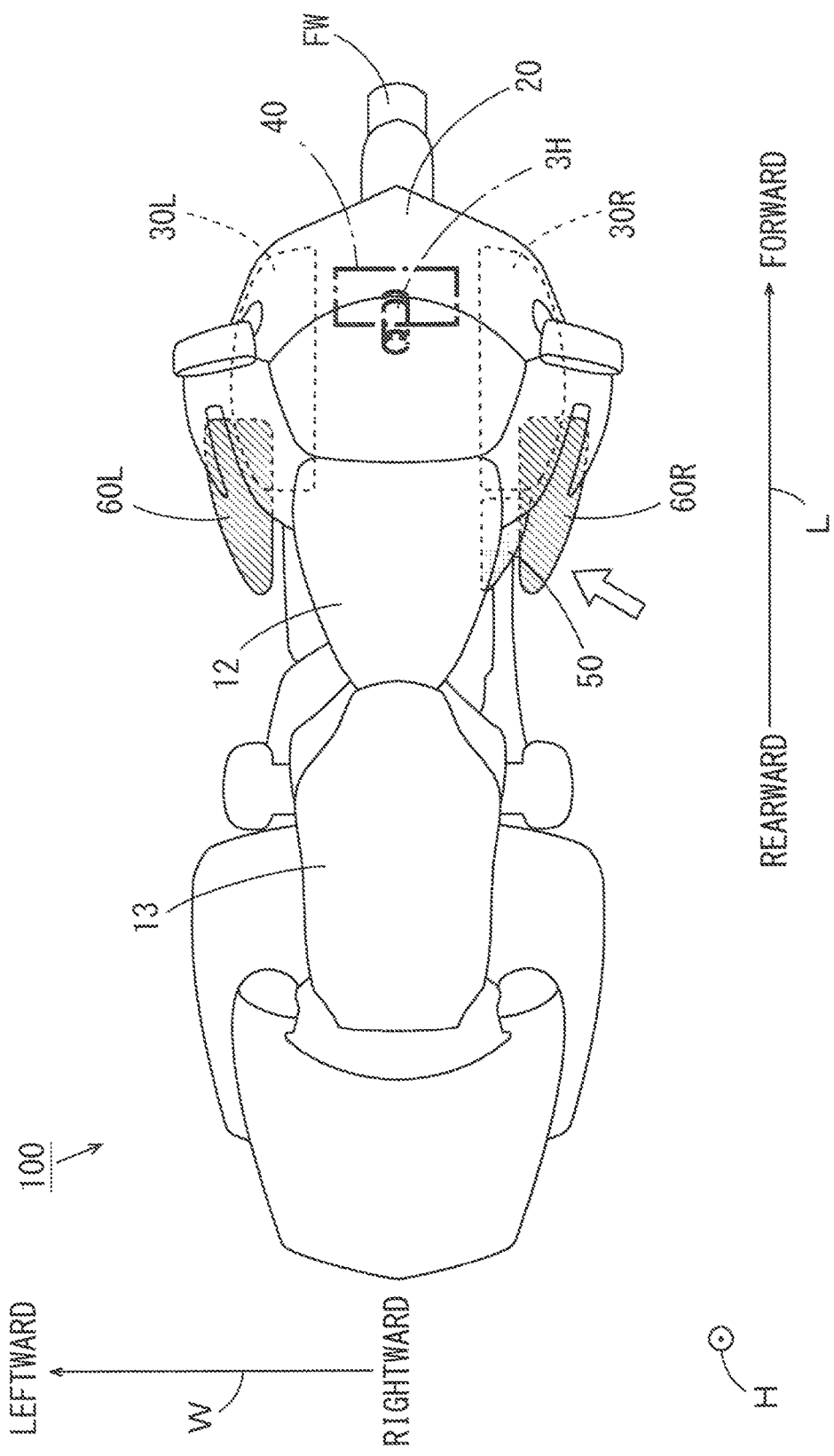
FIG. 2 is a plan view of the motorcycle of FIG. 1.
Figure 3:
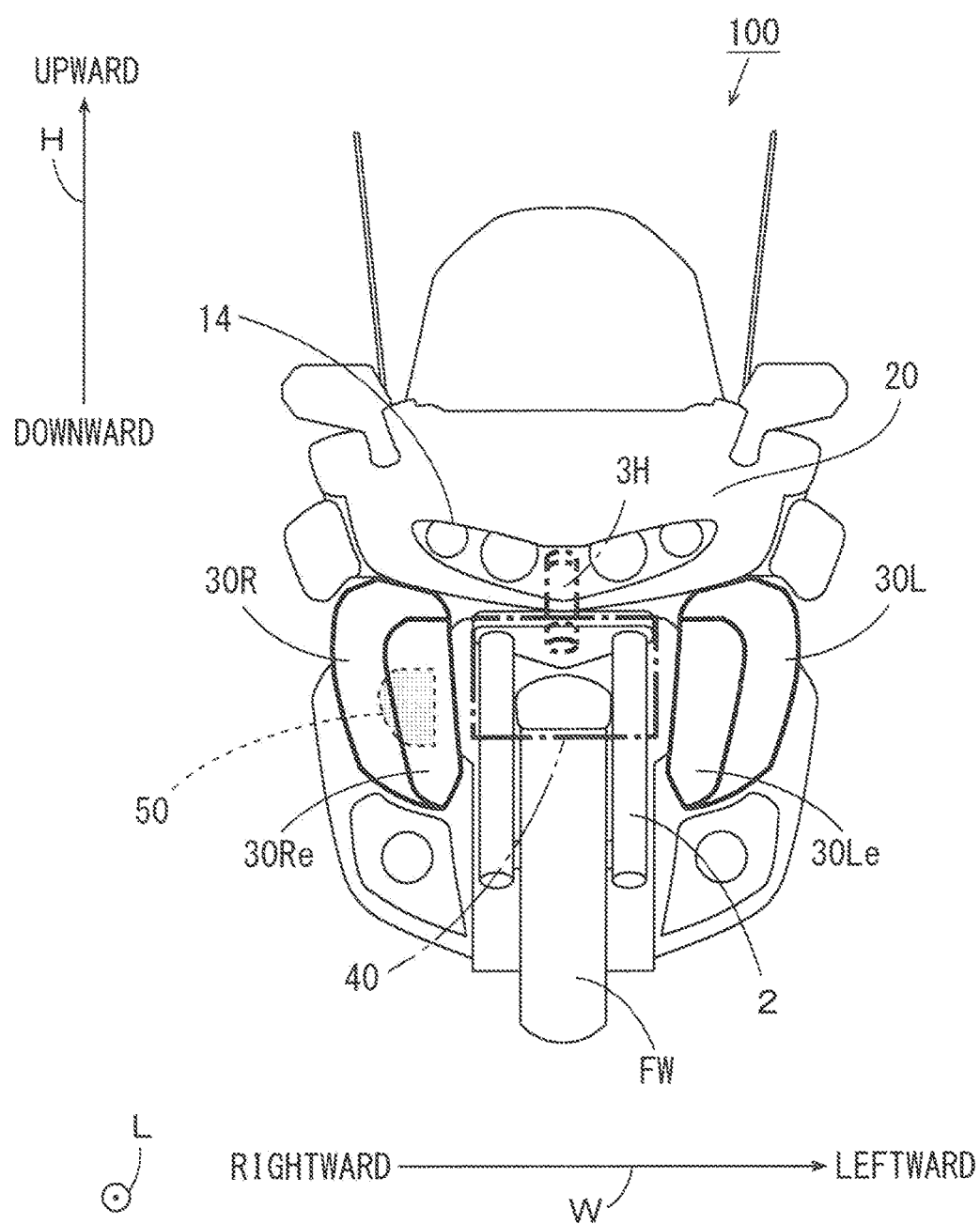
FIG. 3 is a front view of the motorcycle of FIG. 1.

FIG. 1 is a side view of a motorcycle according to one embodiment of the present invention, FIG. 2 is a plan view of the motorcycle 100 of FIG. 1, and FIG. 3 is a front view of the motorcycle 100 of FIG. 1. FIGS. 1 to 3 show a state where the motorcycle 100 stands perpendicularly to a road surface. In FIG. 1 and the subsequent figures of the drawing, a front-and-rear direction L, a width direction W, and a top-and-bottom direction H of the motorcycle 100 are indicated by arrows as appropriate. In the following description, a direction in which an arrow is directed in the front-and-rear direction L is referred to as forward, and its opposite direction is referred to as rearward. A direction in which an arrow is directed in the width direction W is referred to as leftward, and its opposite direction is referred to as rightward. Further, a direction in which an arrow is directed in the top-and-bottom direction H is referred to as upward, and its opposite direction is referred to as downward.

As shown in FIG. 1, the motorcycle 100 according to this embodiment is a so-called cruiser type motorcycle. A vehicle main body 1 of the motorcycle 100 includes a front fork 2, a body frame 3, a rear frame 4, a V-type engine 5, and a swing arm 6. In FIG. 1, the body frame 3, the rear frame 4, and the swing arm 6 are denoted by the bold dot and dashed line. The body frame 3 includes a head pipe 3H and a main frame 3M. The main frame 3M is formed to extend rearward and downward from the head pipe 3H.

The front fork 2 is attached to the head pipe 3H. A front wheel FW is rotatably provided at a lower end of the front fork 2. The engine 5 is arranged in a region surrounded by the body frame 3 in a vehicle side view, and is supported by the body frame 3. The engine 5 of this example has a front cylinder 5A and a rear cylinder 5B lined up in the front-and-rear direction L. A radiator 40 is provided outside of the region surrounded by the body frame 3 at a position forward of the engine 5. In FIGS. 1 to 3, the radiator 40 is denoted by the bold dot and dashed line together with the head pipe 3H of the body frame 3. The rear arm 4 is provided to extend rearward from a rear end of the body frame 3.

A handle 11 is provided at a position upward of the head pipe 3H. A fuel tank 12 is provided at a position rearward of the handle 11. The fuel tank 12 is supported by the main frame 3M and arranged at a position upward of the engine 5. A seat 13 is provided at a position rearward of the fuel tank 12.

The swing arm 6 is supported by the body frame 3 together with the engine 5, and provided to extend rearward from a lower portion of the rear end of the body frame 3 at a position downward of the rear frame 4. A rear wheel RW is rotatably provided at a rear end of the swing arm 6. The rear wheel RW is rotated by power generated by the engine 5.

An air cleaner case 50 is provided on one of opposite sides of the engine 5 (the right side of the engine 5 in this example) in the width direction W. The air cleaner case 50 is arranged to overlap with part of the engine 5 in the vehicle side view. Specifically, the air cleaner case 50 is arranged to overlap mainly with an upper portion of the front cylinder 5A of the engine 5 in the vehicle side view. The air cleaner case 50 stores a filter element 59 (FIG. 4) as described below.

The air cleaner case 50 is arranged at a position further forward than a front end of the seat 13 and further downward than the fuel tank 12 in the vehicle side view. Part of the air cleaner case 50 is located at a position further upward than a lower end 13b of the seat 13 in the vehicle side view. The air cleaner case 50 and the seat 13 may be provided such that the entire air cleaner case 50 is located at a position further upward than the lower end 13b of the seat 13 in the vehicle side view.

A pair of right and left footboards 60R, 60L (FIG. 2) is provided to sandwich a lower portion of the engine 5 therebetween in the width direction W at a position further downward than the air cleaner case 50. As shown in FIG. 2, part of the air cleaner case 50 overlaps with the right footboard 60R in a vehicle plan view. In FIG. 2, the handle 11 of FIG. 1 is not shown in order to facilitate understanding of positional relationships between the air cleaner case 50 and the footboards 60R, 60L. The air cleaner case 50 is represented by a dotted pattern, and the footboards 60R, 60L are represented by hatching. The air cleaner case 50 and the footboard 60R may be provided such that the entire air cleaner case 50 overlaps with the right footboard 60R in the vehicle plan view.

Moreover, as shown in FIG. 2, a side end of the air cleaner case 50 (a right side end in this example) is located at a position further outward (rightward in this example) than a side end of the fuel tank 12 (a right side end in this example) in the width direction W in the vehicle plan view.

As shown in FIG. 1, a head lamp 14 is provided at a position forward of the head pipe 3H. As shown in FIG. 3, an upper cowl 20 is provided to cover an upper portion and opposite side portions of the head lamp 14. A pair of right and left middle cowls 30R, 30L is provided to extend downward from opposite right and left side portions of the upper cowl 20. Front edge portions 30Re, 30Le of the middle cowls 30R, 30L are located at positions further downward than the head lamp 14 and further upward than the lower end of the front fork 2 in a vehicle front view. The middle cowls 30R, 30L are denoted by the bold solid line in FIGS. 1 and 3.

As shown in FIGS. 2 and 3, the right and left middle cowls 30R, 30L are arranged at positions rightward and leftward of the head pipe 3H and the radiator 40, which are located at positions frontward of the engine 5 in the vehicle front view and the vehicle plan view. Thus, part of the head pipe 3H, the radiator 40, and vehicle components provided around the head pipe 3H or the radiator 40 are protected against rainwater and the like by the pair of middle cowls 30R, 30L. The head pipe 3H, the radiator 40, and the middle cowls 30R, 30L may be provided such that only one of the head pipe 3H and the radiator 40 is positioned between the middle cowls 30R and 30L.

As shown in FIG. 1, a large part of the right middle cowl 30R is disposed at a position forward of the air cleaner case 50. As shown in FIG. 3, part of the right middle cowl 30R overlaps with the air cleaner case 50 in the vehicle front view. In FIG. 3, the air cleaner case 50 is represented by a dotted pattern. The right middle cowl 30R and the air cleaner 50 may be provided such that the entire right middle cowl 30R is disposed at a position forward of the air cleaner case 50.

In this embodiment, the air cleaner case 50, part of the right middle cowl 30R, and part of a space inward of the right middle cowl 30R mainly constitute an air cleaner 900 as denoted by the bold dot line of FIG. 1. A configuration of the air cleaner 900 included in the motorcycle 100 will be described in the following.

(2) Function of Air Cleaner 900

Figure 4:
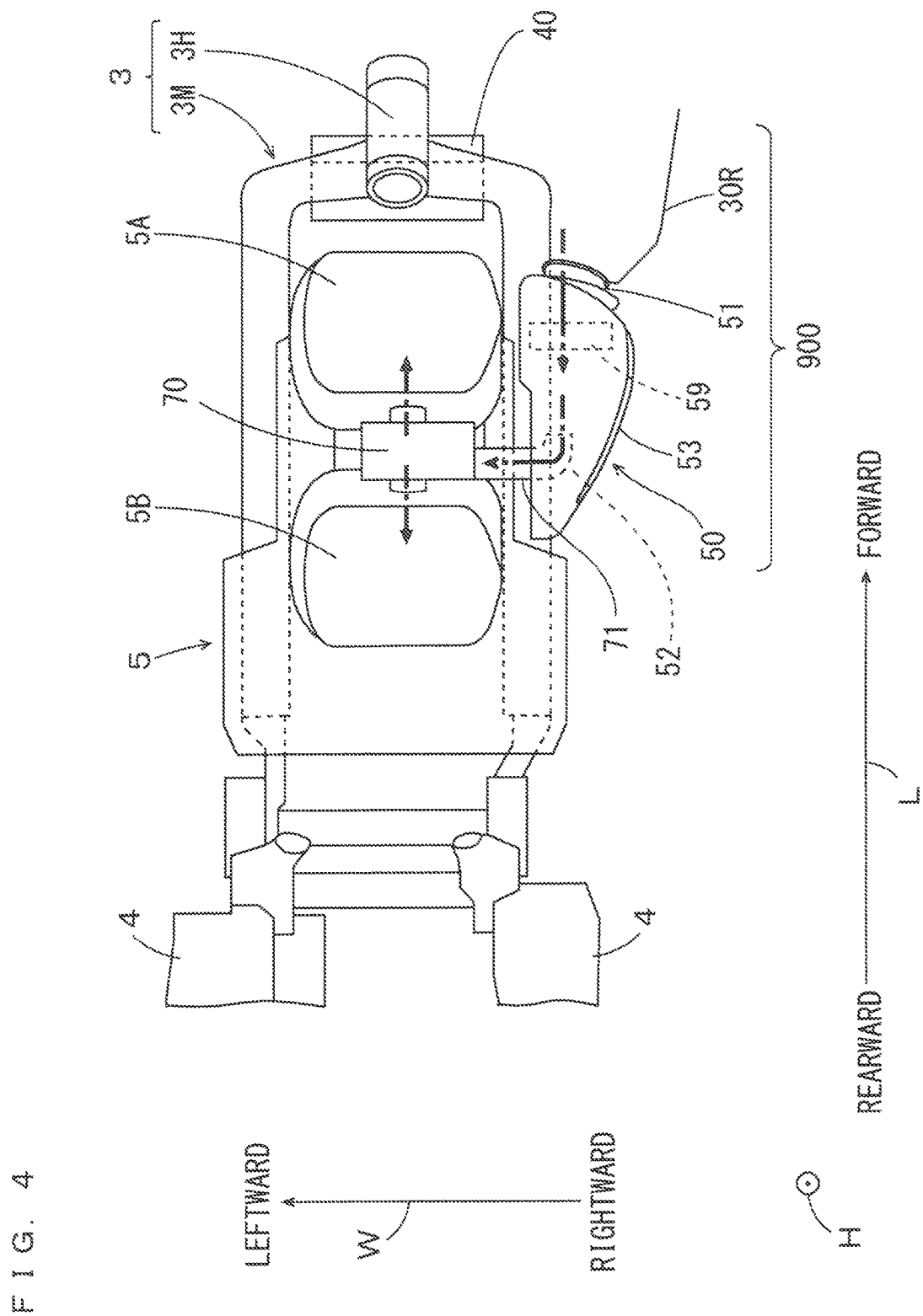
FIG. 4 is a plan view for explaining the function of an air cleaner provided in the motorcycle of FIG. 1.

FIG. 4 is a plan view for explaining the function of the air cleaner 900 provided in the motorcycle 100 of FIG. 1. As shown in FIG. 4, the air cleaner case 50 constituting part of the air cleaner 900 includes a communicating portion 51, an air lead-out portion 52, a case main body 53, and a filter element 59. A right edge of the case main body 53 is the most distant from the engine 5 at a position rightward of the front cylinder 5A and is gradually closer to the engine 5 rearward from the position rightward of the front cylinder 5A in the vehicle plan view. On the other hand, a left edge of the case main body 53 extends in the front-and-rear direction L with a substantially constant spacing from the engine 5. As such, a width of the case main body 53 of the air cleaner case 50 (a size of the case main body 53 in the width direction W) is maximum at the position rightward of the front cylinder 5A in the vehicle plan view. The width of the case main body 53 becomes gradually smaller rearward from the maximum width position.

The communicating portion 51 that makes a space in the case main body 53 and the space inward of the middle cowl 30R communicate with each other is provided at a front end of the case main body 53. The filter element 59 is stored in the case main body 53. The air lead-out portion 52 that opens from the inside of the case main body 53 to a space leftward of the case main body 53 is provided in a rear half portion of the case main body 53.

A throttle body 70 is provided between the front cylinder 5A and the rear cylinder 5B of the engine 5. The air lead-out portion 52 of the air cleaner case 50 and the throttle body 70 are connected by a pipe 71. The throttle body 70 includes a throttle valve, an injector, a valve actuator, etc. and is connected to respective intake ports of the front cylinder 5A and the rear cylinder 5B.

In the air cleaner 900 according to this embodiment, during operation of the engine 5, air in the space inward of the middle cowl 30R flows into the case main body 53 through the communicating portion 51 as denoted by the bold dot and dashed line of FIG. 4. The air, which has flowed into the case main body 53 is purified by the filter element 59 and then led out from the air lead-out portion 52. The clean air led out from the air lead-out portion 52 of the air cleaner 900 flows into the throttle body 70 through the pipe 71. After that, the air, which has flowed into the throttle body 70, flows into the respective intake ports of the front cylinder 5A and the rear cylinder 5B together with fuel. In this way, the air cleaner 900 is used in common for the front cylinder 5A and the rear cylinder 5B of the engine 5.

(3) Detail of Each of Constituent Elements of Air Cleaner 900

Figure 5:
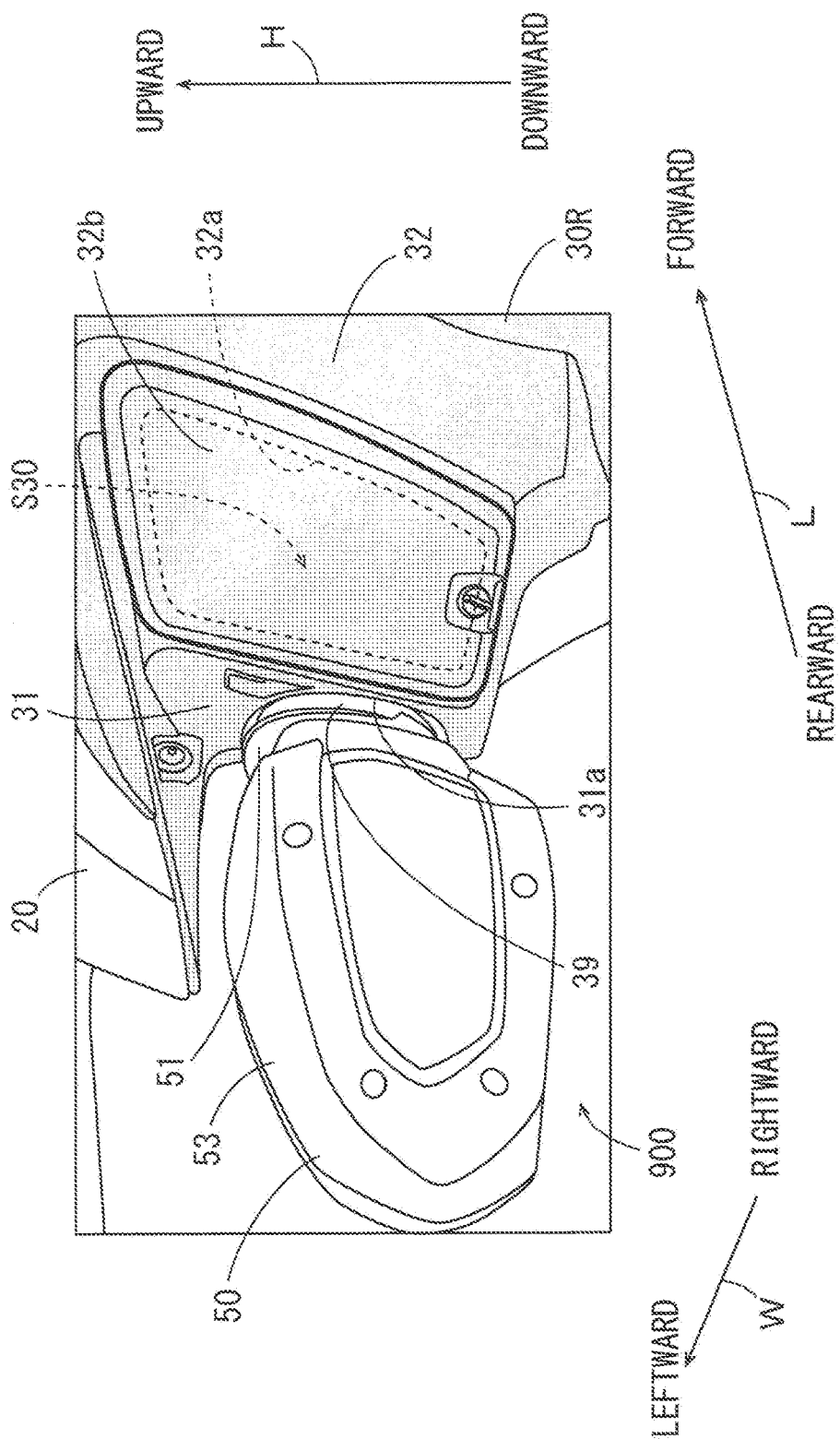
FIG. 5 is a perspective view of the appearance of an air cleaner case and a peripheral portion thereof as viewed in the blank arrow direction of FIG. 2.

FIG. 5 is a perspective view of the appearance of the air cleaner case 50 and a peripheral portion thereof as viewed in the blank arrow direction of FIG. 2. In FIG. 5, the right middle cowl 30R is represented by a dot pattern. As shown in FIG. 5, the middle cowl 30R has a right rear wall 31 directed mainly rearward of the vehicle and a right sidewall 32 directed mainly rightward of the vehicle, and is attached to a lower portion of the upper cowl 20. A space separated from the outside of the middle cowl 30R is formed at a position inward of the middle cowl 30R, i.e., at the position forward of the right rear wall 31 and leftward of the right sidewall 32 below the upper cowl 20. The space inward of the middle cowl 30R is referred to as the cowl space S30 in the following description.

The communicating portion 51 of the air cleaner case 50 has a substantially cylindrical shape and functions as a duct for leading air in the cowl space S30 into the case main body 53. An opening 31a into which the communicating portion 51 can be inserted is formed in a substantially center portion of the right rear wall 31. In the vehicle main body 1 (FIG. 1), the air cleaner case 50 is fixed with a front end of the communicating portion 51 inserted in the opening 31a of the right rear wall 31.

In a portion of the right sidewall 32 that is located at a position forward of the air cleaner case 50 and in the vicinity of the right rear wall 31, an opening 32a having a substantially rectangular shape is formed, and a lid 32b that closes the opening 32a is also provided. The lid 32b is configured to be openable and closable with respect to the opening 32a. In FIG. 5, an outer edge of the lid 32b is denoted by the bold solid line.

Figure 6:
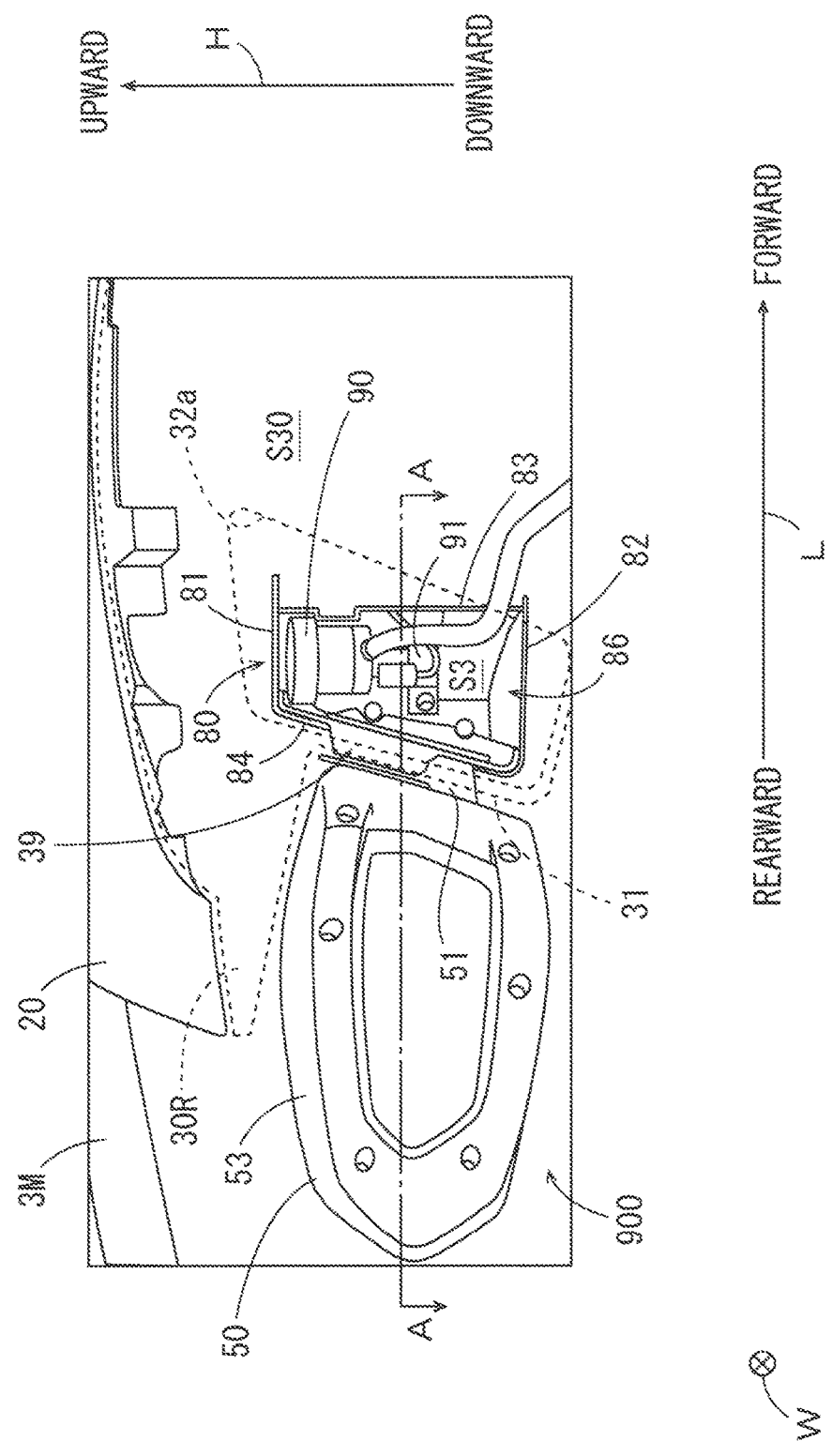
FIG. 6 is a side view of the air cleaner case and the peripheral portion thereof as viewed from a position rightward of the vehicle.
Figure 7:
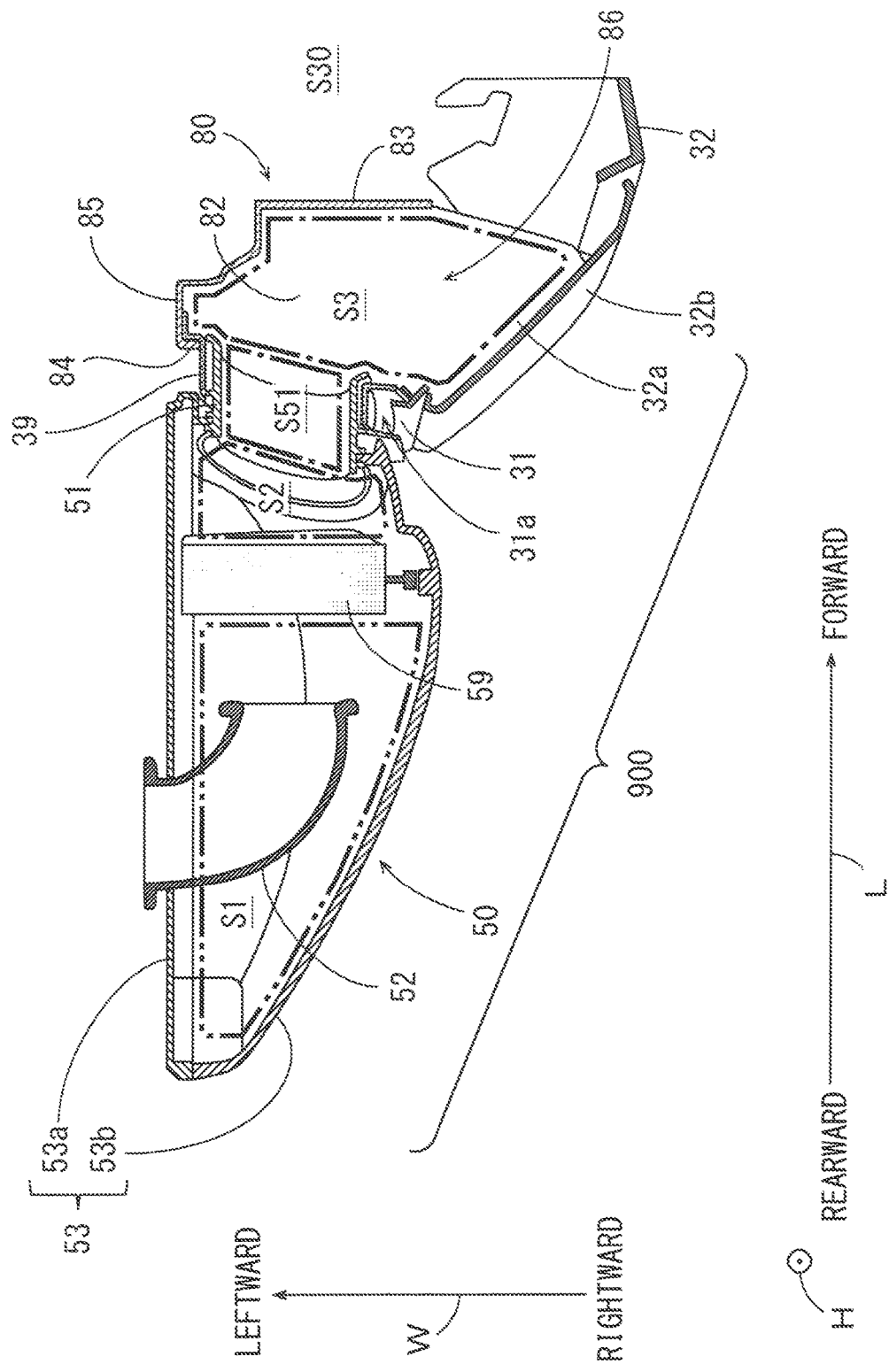
FIG. 7 is a cross sectional view taken along the line A-A of FIG. 6.
Figure 8:
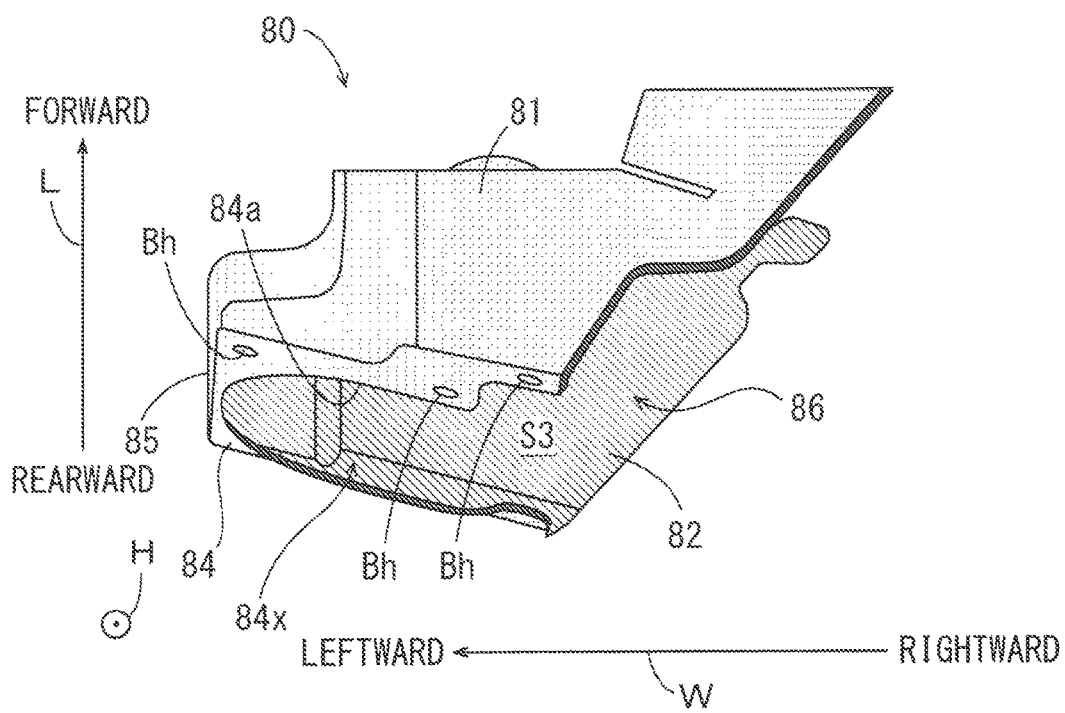
FIG. 8 is a plan view of a dirty side member attached to a communicating portion of the air cleaner case.
Figure 9:
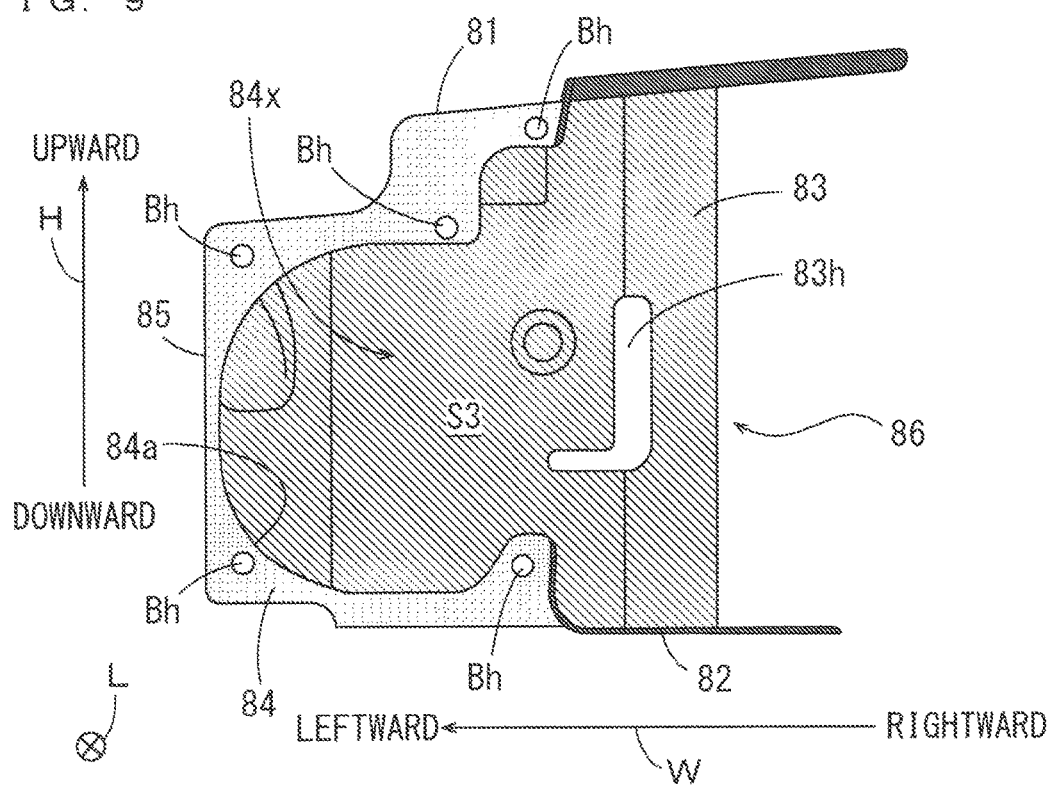
FIG. 9 is a back view of the dirty side member attached to the communicating portion of the air cleaner case.
Figure 10:
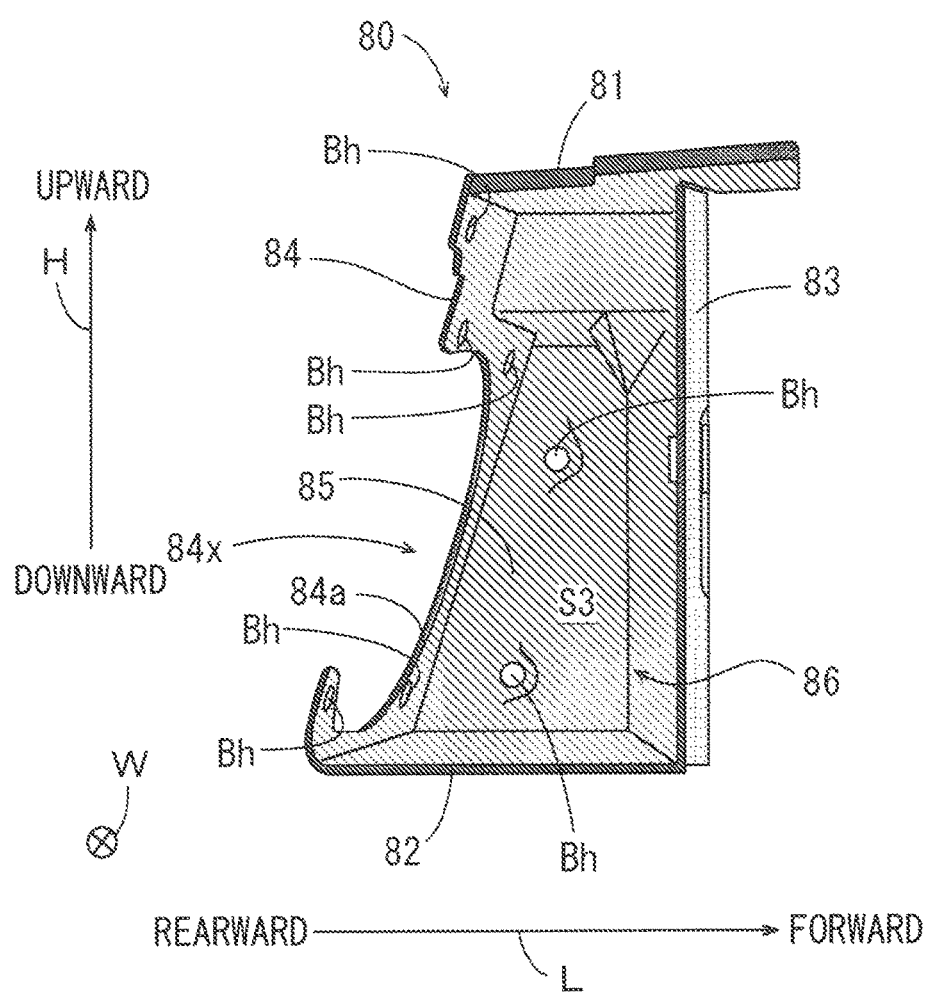
FIG. 10 is a side view of the dirty side member attached to the communicating portion of the air cleaner case.

FIG. 6 is a side view of the air cleaner case 50 and the peripheral portion thereof as viewed from a position rightward of the vehicle, and FIG. 7 is a cross sectional view taken along the line A-A of FIG. 6. FIGS. 8, 9, and 10 are a plan view, a back view, and a side view, respectively, of a dirty side member attached to the communicating portion 51 of the air cleaner case 50. In FIG. 6, an outer shape of the middle cowl 30R is denoted by the dot line, and part of a structure provided in the cowl space S30 inward of the middle cowl 30R is denoted by the solid line.

As shown in FIG. 6, in the cowl space S30, a dirty side member 80 is attached to the front end of the communicating portion 51 of the air cleaner case 50, which projects forward from the right rear wall 31. The dirty side member 80 is a single member formed of rubber.

As shown in FIGS. 8 to 10, the dirty side member 80 has an upper wall 81, a lower wall 82, a front wall 83, a rear wall 84, and one sidewall 85. The upper wall 81 and the lower wall 82 are opposite to each other in the top-and-bottom direction H. The front wall 83 and the rear wall 84 are opposite to each other in the front-and-rear direction L. The one sidewall 85 is formed to connect a left end of the upper wall 81, a left end of the lower wall 82, a left end of the front wall 83, and a left end of the rear wall 84.

In FIGS. 8 to 10, in order to facilitate understanding of the structure of the dirty side member 80, a surface of the dirty side member 80 that is directed outward from the center (outer surface) is represented by a dot pattern. A surface of the dirty side member 80 that is directed to the center (inner surface) is lightly hatched, and an end surface to be a boundary between the outer surface and the inner surface is darkly hatched.

In the dirty side member 80, a space S3 surrounded by the upper wall 81, the lower wall 82, the front wall 83, the rear wall 84, and the one sidewall 85 (hereinafter referred to as the member space) is formed. The dirty side member 80 does not have another sidewall opposite to the one sidewall 85. As such, a right end of the dirty side member 80 is an open portion 86 that opens the member space S3.

A fitted portion 84a in which the communicating portion 51 of the air cleaner case 50 can be fitted is formed on the rear wall 84. The fitted portion 84a forms an opening that corresponds to an outer shape of the communicating portion 51. The opening formed by the fitted portion 84a functions as a communication port 84x that makes the member space S3 of the dirty side member 80 and a space in the communicating portion 51 (hereinafter referred to as the communication space) S51 (FIG. 7) communicate with each other. A plurality of bolt holes Bh are formed in each of the rear wall 84 and the one sidewall 85. A holder insertion hole 83h (FIG. 9) is formed in the front wall 83.

As shown in FIG. 6, the dirty side member 80 is attached to a tip of the communicating potion 51 in the cowl space S30. Specifically, the tip of the communicating portion 51 is fitted in the fitted portion 84a of FIGS. 8 to 10. In this state, a plurality of bolts not shown are attached to a metallic fixing member 39 through the plurality of bolt holes Bh formed in the dirty side member 80 (FIGS. 8 to 10). Further, the fixing member 39 is attached to a bracket not shown connected to the main frame 3M, for example. Thus, the dirty side member 80 is fixed in the cowl space S30 such that the open portion 86 is directed rightward of the vehicle. At that time, the opening 32a of the middle cowl 30R overlaps with the open portion 86 of the dirty side member 80 in the vehicle side view.

Also, a holder 91 (see FIG. 6) is inserted in the holder insertion hole 83h (FIG. 9) formed in the front wall 83 of the dirty side member 80 while the dirty side member 80 is fixed in the cowl space S30. A portion of the holder 91 that is positioned outside of the dirty side member 80 is fixed to the bracket not shown, and a component 90 (see FIG. 6) is attached to another portion of the holder 91 that is positioned in the member space S3. In this embodiment, a reservoir tank of a brake fluid as the component 90 is held by the holder 91. The component 90 held by the holder 91 may be another component such as a switch or a meter in place of the reservoir tank. In FIG. 7, the holder 91 or the component 90 in the member space S3 is not shown.

As shown in FIG. 7, the case main body 53 of the air cleaner case 50 is constituted by a first wall member 53a and a second wall member 53b that extend in the front-and-rear direction L. The first wall member 53a has a substantially plate-like shape and is arranged substantially parallel to the front-and-rear direction L and the top-and-bottom direction H. The second wall member 53b forms a right edge of the air cleaner case 50 and is curved so as to bulge rightward of the vehicle in the vehicle plan view and the vehicle front view (See FIGS. 3 and 4). The first wall member 53a and the second wall member 53b have substantially the same outer shape in the vehicle side view. An outer edge portion of the first wall member 53a and an outer edge portion of the second wall member 53b are joined to each other in the vehicle side view. As such, the case main body 53 is formed. A rear end of the communicating portion 51 is connected to the front end of the case main body 53.

The filter element 59 stored in the case main body 53 divides the space in the case main body 53 into a downstream space S1 positioned at a position further downstream than the filer element 59 and an upstream space S2 positioned at a position further upstream than the filter element 59. Inside of the case main body 53, the filter element 59 is provided at a position that is closer to the front end than the rear end of the case main body 53 in the front-and-rear direction L such that the upstream space S2 is smaller than the downstream space S1. In this example, the filter element 59 is disposed in the vicinity of the front end of the case main body 53.

The air lead-out portion 52 is attached to the first wall member 53a. The air lead-out portion 52 has a curved cylindrical shape and makes the downstream space S1 of the case main body 53 and a space leftward of the case main body 53 (a space outside of the case main body 53) communicate with each other.

In the above-described configuration, the downstream space S1 of the air cleaner case 50 constitutes a clean side chamber of the air cleaner 900. Also, the upstream space S2 of the air cleaner case 50, the member space S3 of the dirty side member 80, and the communication space S51 of the communicating portion 51 constitute a dirty side chamber of the air cleaner 900.

(4) Effects of Embodiment (a) In the motorcycle 100 according to this embodiment, the pair of middle cowls 30R, 30L is arranged at positions rightward and leftward of the head pipe 3H and the radiator 40, which are positioned forward of the engine 5. Thus, the head pipe 3H, the radiator 40, and the vehicle components provided around the head pipe 3H and the radiator 40, which are positioned between the middle cowls 30R and 30L are protected against rain water and the like. The part of the right middle cowl 30R is disposed at a position further forward than the air cleaner case 50. The part of the right middle cowl 30R overlaps with the air cleaner case 50 in the vehicle front view. The space in the case main body 53 of the air cleaner case 50 is divided into the downstream space S1 and the upstream space S2 by the filter element 59. The upstream space S2 and the member space S3 of the dirty side member 80 provided in the cowl space S30 communicate with each other by the communicating portion 51. Thus, the upstream space S2, the member space S3, and the communication space S51 of the communicating portion 51 constitute the dirty side chamber.

In this way, at least part of the cowl space S30 of the right middle cowl 30R serves as the dirty side chamber of the air cleaner 900. As such, it is possible to ensure the dirty side chamber having a sufficient capacity without enlarging the upstream space S2 in the case main body 53 while ensuring the largeness of the downstream space S1 in the case main body 53 constituting the clean side chamber. It is thus possible to ensure the clean side chamber having a sufficient capacity while reducing an increase in size of the air cleaner 900.

In this case, since the member space S3 constituting part of the dirty side chamber is arranged in the cowl space S30 of the right middle cowl 30R, the air cleaner case 50 can be arranged at a position further forward than the seat 13 in the front-and-rear direction L. Furthermore, since the increase in size of the air cleaner 900 is reduced, the amount of a projection of the air cleaner case 50 projecting laterally from the fuel tank 12 can be reduced in the vehicle plan view in a structure in which the air cleaner case 50 is arranged laterally to the engine 5. In addition, since at least part of the air cleaner case 50 is located at a position further upward than the lower end 13b of the seat 13 in the vehicle side view, the air cleaner case 50 is disposed at a higher position upward of the footboards 60R, 60L. Thus, when the rider sits on the seat 13 and puts his/her foot on the footboard 60R, 60L, his/her leg is unlikely to come into contact with the air cleaner case 50.

(b) According to the above-described structure, the open portion 86 of the dirty side member 80 is opposite to an inner surface of the right sidewall 32 of the middle cowl 30R with the dirty side member 80 being fixed in the cowl space S30. In this case, air is led into the member space S3 through the open portion 86 of the dirty side member 80 in the cowl space S30. Thus, air containing rain water and dust is prevented from entering the air cleaner case 50 from outside of the middle cowl 30R.

(c) The opening 32a of the middle cowl 30R overlaps with the open portion 86 of the dirty side member 80 in the vehicle side view. Also, the middle cowl 30R is provided with the lid 32b, which can open and close the opening 32a. In this case, an operator who does maintenance of the motorcycle 100 can easily check the state of the dirty side member 80 and the state in the member space S3 by opening the lid 32b.

(d) The component 90 is stored in the member space S3 of the dirty side member 80. In this case, since the member space S3 functioning as part of the dirty side chamber is effectively utilized as a storage space for the component 90, an increase in size of the motorcycle 100 is reduced.

(e) The dirty side member 80 is formed of rubber. This reduces a vibration sound caused by air flowing into the member space S3 of the dirty side member 80.

(5) Other Embodiments (a) While the right middle cowl 30R, the right dirty side member 80, and the right case main body 53 constitute the air cleaner 900 in the above-described embodiment, the left middle cowl 30L, a left dirty side member, and a left air cleaner case may constitute the air cleaner 900.

(b) While the motorcycle 100 is provided with the middle cowls 30R, 30L in the above-described embodiment, the present invention is not limited to this. The motorcycle 100 may be provided with a pair of right and left side cowls whose upper ends of front edge portions are located at positions further upward than the head lamp 14 and whose lower ends of the front edge portions are located at positions further downward than the lower end of the front fork 2 in the vehicle front view. In this case, at least part of one of the right and left side cowls is disposed at a position forward of the air cleaner case 50 and overlaps with the air cleaner case 50 in the vehicle front view, so that the one side cowl can be used as part of the air cleaner 900 similarly to the above-described middle cowl 30R.

(c) While the dirty side member 80 is provided in the cowl space S30 in the above-described embodiment, the dirty side member 80 does not need to be provided. In this case, the number of components of the motorcycle 100 can be reduced.

(d) While the component 90 is provided in the member space S3 of the dirty side member 80 in the above-described embodiment, the component 90 does not need to be provided in the member space S3. In this case, the dirty side member 80 can be made compact.

(e) While the opening 32a is formed in the right middle cowl 30R, and the lid 32b that closes the opening 32a is provided on the middle cowl 30R in the above-described embodiment, the opening 32a does not need to be formed in the middle cowl 30R. In this case, the lid 32b is no longer necessary, and the number of components of the motorcycle 100 can be reduced.

(f) While the right and left middle cowls 30R, 30L have symmetrical shapes with respect to a vertical surface passing through the center of the vehicle in the width direction W as shown in FIGS. 2 and 3 in the above-described embodiment, the present invention is not limited to this. The right and left middle cowls 30R, 30L may have asymmetrical shapes with respect to the vertical surface passing through the center of the vehicle in the width direction W.

(g) While the above-described embodiment is an example in which the present invention is applied to the cruiser-type motorcycle, the present invention is not limited to this, but may be applied to other vehicles such as a scooter-type motorcycle, a racing-type motorcycle, a four-wheeled motor vehicle, a three-wheeled motor vehicle or an ATV (All Terrain Vehicle).

(6) Correspondences between Constituent Elements in Claims and Parts in Preferred Embodiments In the following paragraphs, non-limiting examples of correspondences between various elements recited in the claims below and those described above with respect to various preferred embodiments of the present invention are explained.

In the above-described embodiment, the motorcycle 100 is an example of a straddled vehicle, the engine 5 is an example of a V-type engine, the head pipe 3H, the radiator 40, and the peripheral members thereof are examples of vehicle components, and the pair of middle cowls 30R, 30L is an example of a pair of side cowls.

The downstream space S1 is an example of a first space, the upstream space S2 is an example of a second space, the cowl space S30 is an example of a third space, the member space S3 is an example of at least part of the third space, and the communication space S51 of the communicating portion 51 is an example of an internal space of a communicating portion.

The upstream space S2 and the portion of the case main body 53 forming the upstream space S2 are an example of an internal dirty side chamber, the member space S3 and the dirty side member 80 forming the member space S3 are an example of an external dirty side chamber, the communication port 84x of the dirty side member 80 is an example of a communication port of the external dirty side chamber, and the open portion 86 of the dirty side member 80 is an example of an open portion of the external dirty side chamber.

As each of various elements recited in the claims, various other elements having configurations or functions described in the claims can be also used.

What is claimed is:

1. A straddled vehicle comprising:

a V-type engine;

a fuel tank arranged at a position upward of the V-type engine;

a seat arranged at a position further rearward than the fuel tank;

an air cleaner case arranged laterally to the V-type engine so as to overlap with at least part of the V-type engine in a vehicle side view, the air cleaner case storing a filter element;

a pair of side cowls arranged at positions rightward and leftward of at least part of a vehicle component located at a position forward of the V-type engine ; and a footboard arranged at a position further downward than the air cleaner case, wherein at least part of one side cowl of the pair of side cowls is arranged at a position further forward than the air cleaner case, the at least part of the one side cowl overlaps with the air cleaner case in a vehicle front view, at least part of the air cleaner case is located at a position further upward than a lower end of the seat in the vehicle side view, the air cleaner case is arranged at a position further forward than a front end of the seat and further downward than the fuel tank, a side end of the air cleaner case is located at a position further outward than a side end of the fuel tank in a vehicle width direction, at least part of the air cleaner case overlaps with the footboard in a vehicle plan view, the filter element divides a space in the air cleaner case into a first space positioned at a position further downstream than the filter element and a second space that is positioned at a position further upstream than the filter element and is smaller than the first space, the air cleaner case has a communicating portion that makes the second space and a third space inward of the one side cowl communicate with each other, and the second space, at least part of the third space, and an internal space of the communicating portion constitute a dirty side chamber.

2. The straddled vehicle according to claim 1, wherein the dirty side chamber includes an internal dirty side chamber constituted by the second space, and an external dirty side chamber constituted by the at least part of the third space, and the external dirty side chamber has a communication port that connects to the communicating portion of the air cleaner case, and an open portion that is opposite to the one side cowl.

3. The straddled vehicle according to claim 2, wherein the one side cowl has an opening that overlaps with at least part of the open portion of the external dirty side chamber in the vehicle side view, and the straddled vehicle further comprises a lid that closes the opening.

4. The straddled vehicle according to claim 2, wherein a component is stored in the external dirty side chamber.

5. The straddled vehicle according to claim 2, wherein the external dirty side chamber is formed of rubber.

6. The straddled vehicle according to claim 1, further comprising a head pipe and a radiator that are provided at a position further forward than the V-type engine, wherein the vehicle component includes at least one of the head pipe and the radiator.

* * * * *